United States Patent [19]

Gasper

[11] Patent Number: 4,689,057
[45] Date of Patent: Aug. 25, 1987

[54] CHEMICAL DRUM DEHUMIDIFYING BREATHER

[75] Inventor: Kenneth E. Gasper, Leawood, Kans.

[73] Assignee: Olin Corporation, Cheshire, Conn.

[21] Appl. No.: 896,043

[22] Filed: Aug. 13, 1986

[51] Int. Cl.$^4$ .............................................. B01D 53/04
[52] U.S. Cl. ................................... 55/275; 55/385 R; 55/387
[58] Field of Search .................. 55/29, 31, 33, 35, 74, 55/274, 275, 316, 319, 385 R, 387

[56] References Cited

U.S. PATENT DOCUMENTS

| | | | |
|---|---|---|---|
| 609,493 | 8/1898 | Beutelspacher | 55/274 |
| 985,966 | 3/1911 | Arnold | 55/316 |
| 1,675,228 | 6/1928 | Schmidt | 55/387 X |
| 1,841,691 | 1/1932 | Wilson | 55/387 X |
| 1,947,797 | 2/1934 | Radford | 55/385 R X |
| 2,203,144 | 6/1940 | Hammond | 55/33 |
| 2,253,295 | 8/1941 | Higgins | 55/387 X |
| 2,335,901 | 12/1943 | Ayers, Jr. | 55/387 X |
| 2,480,379 | 8/1949 | Newberry | 55/274 X |
| 2,526,782 | 10/1950 | Thorpe | 55/274 |
| 2,603,308 | 7/1952 | McCall | 55/387 X |
| 3,236,028 | 2/1966 | Rutan | 55/33 |
| 3,527,029 | 9/1970 | Kirschner | 55/385 R |
| 3,705,480 | 12/1972 | Wireman | 55/275 |
| 3,744,976 | 7/1973 | Tongue | 55/316 X |
| 3,841,484 | 10/1974 | Domnick | 55/274 X |
| 4,146,277 | 3/1979 | Santoro | 55/275 X |
| 4,350,508 | 9/1982 | Santoro et al. | 55/275 |
| 4,504,289 | 3/1985 | Waller | 55/316 |

FOREIGN PATENT DOCUMENTS

| | | | |
|---|---|---|---|
| 1217161 | 5/1960 | France | 55/316 |
| 1200985 | 8/1970 | United Kingdom | 55/316 |
| 406558 | 4/1974 | U.S.S.R. | 55/29 |

OTHER PUBLICATIONS

Kirk-Othmer Encyclopedia of Chemical Technology (Third Edition) Vol. 8 "Drying Agents" pp. 114-129 (1979).

*Primary Examiner*—Robert Spitzer
*Attorney, Agent, or Firm*—William A. Simons; Thomas P. O'Day

[57] ABSTRACT

A drum dehumidifying breather for a liquid chemical container including a desiccant cannister having a top wall, a cylindrical transparent side wall, and a removable bottom wall;

the cannister containing a desiccant material;
the cylindrical side wall having air breather holes located above the top level of the desiccant material for the passage of water-borne air into the cannister;
the cylindrical side wall having a threaded portion which extends below the bottom wall;
the bottom wall being capable of supporting the desiccant material and containing breather holes for the passage of dried air from the cannister;
an annular removable cap having a threaded side wall which is capable of being attached and connected to the threaded portion of the side wall of the cannister;
a supporting cylinder positioned in the annular opening of the cap; one end of the supporting cylinder being in communication with the bottom wall of the cannister and capable of supporting the bottom wall as well as containing breather holes to allow passage of dried air through said supporting cylinder and into the liquid chemical container; and
the opposite end of the supporting cylinder capable of being threaded for attachment to the liquid chemical container.

6 Claims, 3 Drawing Figures

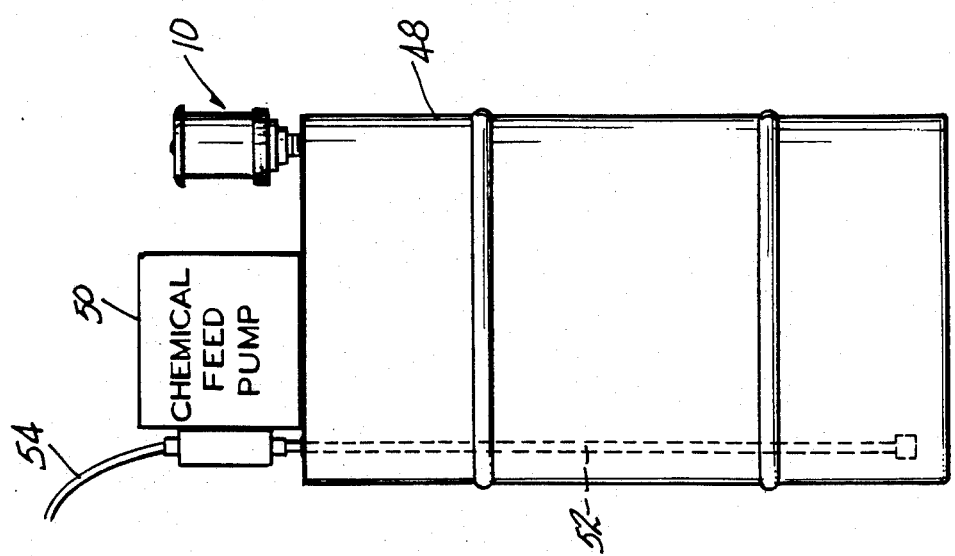
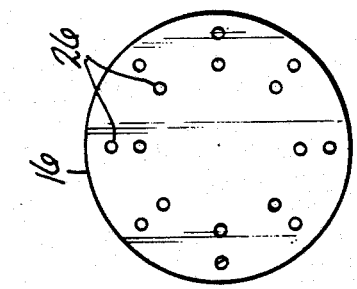
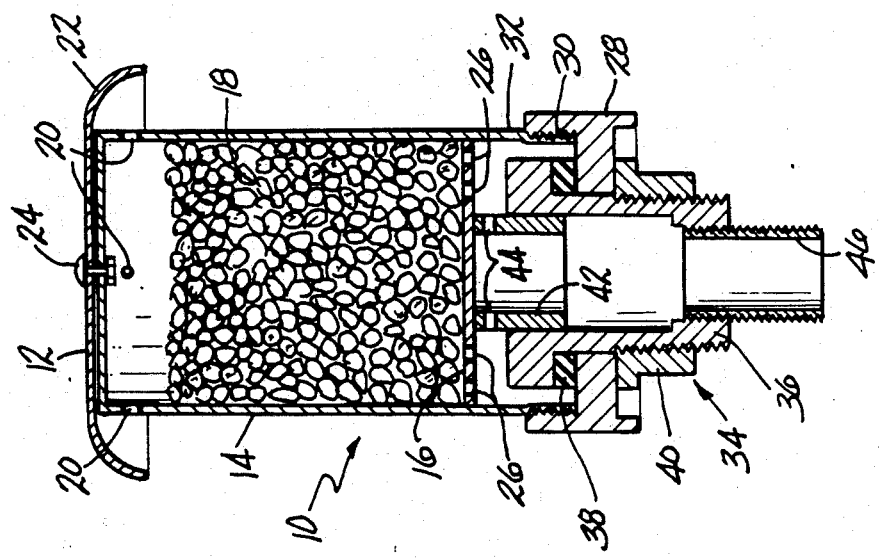

CHEMICAL DRUM DEHUMIDIFYING BREATHER

BACKGROUND OF THE INVENTION

1. Field of the Invention

The present invention relates to an apparatus for removing water vapor from air that enters a container (e.g. drum) containing a deliquescent liquid chemical product as the liquid contents are being withdrawn from the drum.

2. Description of the Prior Art

When liquid chemicals are pumped from a shipping drum or similar container, air or an inert gas (e.g. nitrogen) is drawn into the container to replace the withdrawn liquid. This is usually done by simply opening a bung on the top of the drum.

In the case of deliquescent liquid chemicals like polyacrylamide emulsions used in water treatment, the moisture in the air may cause the liquid to change its physical characteristics such as having a thicker viscosity and being difficult to pump. Moreover, some of the thickened chemical product may not be usable because it cannot be easily removed from the drum.

One solution to this problem is to displace the liquid with an inert gas (e.g. nitrogen) instead of air. However, such installations are relatively costly to set up and operate because they require the use of a container of compressed gas. Moreover, it is very cumbersome to connect and regulate the gas pressure from an inert gas cylinder every time a new drum of chemical is employed. This is especially so when the liquid chemical drum is being used in some inconvenient place such as in a typical water treatment application.

Accordingly, there is a need for a simple and inexpensive apparatus which allows dehumidified air to replace withdrawn liquid chemicals from a drum or similar container.

BRIEF SUMMARY OF THE INVENTION

The present invention, therefore, is directed to a drum dehumidifying breather comprising:

a desiccant cannister having a top wall, a cylindrical transparent side wall, and a removable bottom wall;

said cannister containing a desiccant material;

said cylindrical side wall having air breather holes located above the top level of said desiccant material for the passage of water-borne air into said cannister;

said cylindrical side wall having a threaded portion which extends below the bottom wall;

said bottom wall being capable of supporting the desiccant material and containing breather holes along its outer portions for the passage of dried air from the cannister;

an annular removable cap having a threaded side wall which is capable of being attached to the threaded portion of the side wall of the cannister;

a supporting cylinder positioned in the annular opening of the cap;

one end of said supporting cylinder being in communication with the bottom wall of the cannister and capable of supporting said bottom wall as well as containing breather holes to allow passage of dried air through the supporting cylinder and into a liquid chemical container; and the opposite end of said supporting cylinder capable of being attached to a liquid chemical container.

BRIEF DESCRIPTION OF THE DRAWINGS

FIG. 1 describes a preferred chemical drum dehumidifying breather of the present invention. FIG. 2 shows a top view of the bottom wall of this preferred chemical drum dehumidifying breather. FIG. 3 shows how the breather apparatus is attached to a liquid chemical product drum.

DETAILED DESCRIPTION OF THE PREFERRED EMBODIMENT

FIG. 1 shows a preferred dehumidifying drum breather 10 of the present invention. This breather has a top wall 12, a cylindrical side wall 14 and a bottom wall 16. These walls form a cannister which is Preferably about 250 milliliters in volume. This is filled with a desiccant material 18.

The preferred desiccant material 18 is calcium sulfate. This chemical is available under the tradename DRI-ERITE and is manufactured by the W. A. Hammond Company. It will absorb about 10 to 14 percent of its weight in water with drying air. About ½ pound is used in each cannister of the present invention. Preferably a dye has been added to the calcium sulfate that will change its color from blue to red as it becomes loaded with water and losses its absorbent capability.

The side walls 14 are transparent in nature to allow the operator to observe the desiccant material 18. Side walls 14 also contain breather holes 20 above the top level of the desiccant material 18. This allows for waterborne air to enter the cannister and pass through the full volume of the desiccant material 18. The top and side walls 14 are preferably molded as one piece with any transparent plastic. The most preferred material is glass-clear polymethylpentene. Polyethylene or any other similar transparent plastic or glass containers could alternatively be used.

The cannister has a rain shield 22 attached to the top wall 12 by means of a nut and bolt assembly 24. This rain shield 22 protects the water from dripping down into the breather holes 20 during operation. This rain shield 22 is preferably made of plastic, such as polyethylene in order to keep it from being weathered or rusted.

FIG. 2 clearly shows bottom wall 16 containing breather holes 26 along its outside portions. This bottom wall is also made of polyethylene. The breather holes 26 allow for the dried air to exit the cannister and pass into the drum. It should be noted that the breather holes are along the outside portion of the bottom wall 16 to prevent water droplets which may form in the desiccant material from falling into the drum. Instead, they will fall into the outside portions of a removably cap 28.

This removable cap 28 has a side wall 30 which is threaded. It may be attached to the cannister by a threaded lower portion 32 of the side wall 14 of the cannister. Preferably, the removable cap 28 is made of a plastic, such as polyethylene.

In the annular opening of this removable cap is a supporting cylinder assembly 34. This supporting cylinder assembly 34 is made up of a bulkhead fitting 36 which fits within the annular opening. This bulkhead fitting 36 is held in place by a gasket 38 and a compressor nut 40. The bulkhead fitting 36 and compressor nut 40 are also preferably made of PVC plastic. The gasket is preferably made of neoprene rubber. Also, part of the supporting cylinder assembly 34 is a support column 42 which is attached to the bulkhead fitting 36 by means of solvent bonding. This support column 42 lies next to the bottom wall 16 of the cannister and supports the bottom wall 16 and the desiccant material when the removable cap 28 is threaded into the cannsiter. Support column 42 also contains breather holes 44. These breather holes 44 allow passage of the dried air from below the cannister into the annular support cylinder. The support column 42 is preferably made of polyvinyl chloride (PVC) plastic.

At the bottom of the support cylinder assembly 34 it should be noted that a drum pipe threading 46 is attached thereto. This thread is a male pipe thread which can be fitted to a female drum bung to allow for a water-free contact to the drum.

FIG. 3 shows how the breather 10 of the present invention is operated. As can be seen, the breather 10 is attached to the top of a drum 48 which contains a liquid chemical product. This drum also has a liquid pump 50 attached to it and extending down into the drum is a suction line 52 which withdraws the chemical from the drum into the discharge line 54 to the point of use. In operation, as the pump 50 removes the chemical product from drum 48 by means of the suction line 52, dehumidified air is drawn into the drum through breather 10 according to the above-mentioned method.

The present invention has several advantages. In this method, the cannister portion of the breather may be refilled when needed. The breather may be easily installed on chemical drums and easily removed when changing drums. Moreover, chemical drums can be used in out of the way places without causing expensive operation costs. This method also allows for easy pumping of very sensitive chemicals such as polyacrylamide copolymers used in water treatment and it prevents the non-use of thickened chemical at the bottom of the tank which cannot be pumped out.

What is claimed is:

1. A drum dehumidifying breather for a liquid chemcial container comprising a desiccant cannister having a top wall, a cylindrical transparent side wall, and a removable bottom wall;

said cannsiter containing a desiccant material;

said cylindrical side wall having air breather holdes located above the top level of said desiccant material for the passage of water-borne air into said cannister;

said cylindrical side wall having a threaded portion which extends below the bottom wall;

said bottom wall being capable of supporting said desiccant material and containing breather holes for the passage of dried air from said cannister;

an annular removable cap having a threaded side wall which is capable of being attached and connected to the threaded portion of said side wall of said cannister;

a supporting cylinder positioned in the annular opening of said cap; one end of said supporting cylinder being in communication with said bottom wall of said cannister and capable of supporting said bottom wall as well as containing breather holes to allow passage of dried air through said supporting cylinder and into said liquid chemical container; and the opposite end of said supporting cylinder capable of being threaded for attachment to said liquid chemical container.

2. The drum dehumidifying breather of claim 1 wherein said cylindrical side wall is made of polymethylpentene.

3. The drum dehumidifying breather of claim 1 wherein said desiccant material is calcium sulfate.

4. The drum dehumidifying breather of claim 1 wherein said cylindrical support is threaded into said liquid chemical container.

5. The drum dehumidifying breather of claim 1 wherein a rain shield is placed over said top and side wall the prevent water from dripping into said breather holes in said side wall.

6. A liquid chemical drum having the drum dehumidifying breather of claim 1 attached thereto.

* * * * *